United States Patent
Hakl et al.

(10) Patent No.: US 9,020,218 B2
(45) Date of Patent: Apr. 28, 2015

(54) METHODS AND APPARATUS FOR GENERATING A MODIFIED INTENSITY PROJECTION IMAGE

(75) Inventors: Kevin Scott Hakl, Oxford (GB); Matthew David Kelly, Botley (GB); Christian Mathers, Oxford (GB)

(73) Assignee: Siemens Medical Solutions USA, Inc., Malvern, PA (US)

(*) Notice: Subject to any disclaimer, the term of this patent is extended or adjusted under 35 U.S.C. 154(b) by 718 days.

(21) Appl. No.: 13/304,865

(22) Filed: Nov. 28, 2011

(65) Prior Publication Data

US 2012/0177258 A1    Jul. 12, 2012

(30) Foreign Application Priority Data

Nov. 26, 2010 (GB) .................................. 1020073.1

(51) Int. Cl.
*G06K 9/00* (2006.01)
*G06K 9/34* (2006.01)
*G06T 15/08* (2011.01)
*G06T 19/20* (2011.01)
*G06T 7/00* (2006.01)

(52) U.S. Cl.
CPC ................ *G06T 15/08* (2013.01); *G06T 19/20* (2013.01); *G06T 2219/2012* (2013.01); *G06T 7/0081* (2013.01); *G06T 2207/10072* (2013.01); *G06T 2207/20068* (2013.01); *G06T 2207/30004* (2013.01)

(58) Field of Classification Search
CPC ....... G06T 5/00; G06T 7/0012; G06T 7/0081; G06T 15/08; G06T 19/20; G06T 2219/2012
See application file for complete search history.

(56) References Cited

U.S. PATENT DOCUMENTS

| | | | |
|---|---|---|---|
| 8,605,965 B2* | 12/2013 | Kadir et al. | 382/128 |
| 2001/0055016 A1 | 12/2001 | Krishnan | |
| 2004/0013290 A1 | 1/2004 | Krishnan | |
| 2004/0096088 A1* | 5/2004 | Kohle | 382/128 |
| 2006/0235294 A1 | 10/2006 | Florin et al. | |
| 2008/0278490 A1 | 11/2008 | Dekel | |
| 2009/0036749 A1 | 2/2009 | Freiburger et al. | |
| 2009/0046914 A1 | 2/2009 | Khazen et al. | |
| 2009/0129641 A1 | 5/2009 | Zhou | |
| 2009/0174729 A1 | 7/2009 | Matsumoto | |
| 2013/0101197 A1* | 4/2013 | Kaftan et al. | 382/131 |

FOREIGN PATENT DOCUMENTS

WO    2006058343 A1    6/2006

OTHER PUBLICATIONS

Kim et al., "Enhanced visualization of MR angiogram with modified MIP and 3D image fusion", May 7, 1997, Proc. SPIE 3031, Medical Imaging 1997: Image Display, vol. 3031, p. 31-36.*

* cited by examiner

*Primary Examiner* — Stephen R Koziol
*Assistant Examiner* — Timothy Choi
(74) *Attorney, Agent, or Firm* — Schiff Hardin LLP

(57) ABSTRACT

In a method or apparatus for generating, from medical image data of a subject from a functional imaging modality, a modified intensity projection image for display. An intensity projection image data set is obtained from the image data. A segmentation for the image data is obtained. Based on information from the segmentation, a modified display property is calculated for at least one voxel of the intensity projection image data set.

13 Claims, 6 Drawing Sheets

METHODS AND APPARATUS FOR GENERATING A MODIFIED INTENSITY PROJECTION IMAGE

BACKGROUND

This disclosure is directed to methods and apparatus for generating, from medical image data of a subject from a functional imaging modality, a modified intensity projection image for display.

In the medical imaging field, several imaging schemes are known. For example PET (Positron Emission Tomography) is a method for imaging a subject in 3D using an injected radioactive substance which is processed in the body, typically resulting in an image indicating one or more biological functions. Other such functional imaging modalities are known, such as SPECT.

In such functional images, many important pathologies and anatomical structures appear as very high (or low) intensities. For example, a tumor in an FDG-PET image will often appear as a bright region.

A Maximum Intensity Projection (MIP) image is a useful way to visualize such medical images. Each pixel in a MIP is the maximal intensity along a ray orthogonal to the plane of the MIP. The resulting pixel values come from different depths along the rays and hence a MIP can be thought of as a simple form of 3D visualisation.

Maximum Intensity Projections (MIP) of PET data are commonly used by clinicians to provide an overview of the acquired data, facilitating rapid identification of potential lesions. However, when constructing a MIP, information regarding the position of the intensity along the axis of projection (i.e., depth) is lost. As such, it can be difficult to determine visually in which region of the body or organ the intensity is located. For instance, it may be difficult to determine whether a lesion located at the edge of the lung, is located in the lung, or in the ribs.

Figure 11:
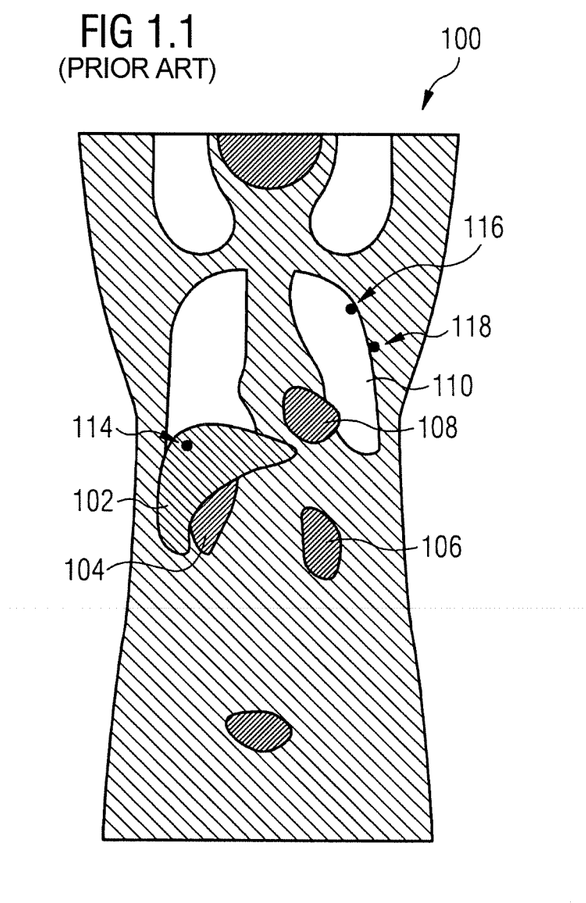

For example, FIG. 1.1 is a schematic illustration of a MIP from PET data (100). There are a number of organ regions visible (102, 104, 106, 108, 110) each having different uptake/intensity. In this simplified example, each organ broadly has the same uptake across the organ. There are also a number of hotspots (114, 116, 118). Two of these (116, 118) appear to be either on the periphery of the lung, on the rib, or in some nearby intervening tissue—it is difficult to tell from the MIP.

One solution to this problem, that is available in some medical imaging software packages, is to enable automatic navigation from an intensity in the PET MIP to its corresponding position in multi-planar reconstructed (MPR) views (i.e., axial, sagittal and coronal slices) of the PET overlaid on the corresponding CT data. This enables the clinician to correlate the location of the intensity in the PET image with the corresponding anatomical position in the CT.

One disadvantage of this approach is the additional user input required (i.e., to click on the intensity and read the fused MPR) which precludes a rapid, interaction-free, assessment of the MIP.

An alternative method that enables anatomical localization in a MIP is the generation of organ-specific MIPs, disclosed in US 2009/0129641. This approach uses organ segmentations derived from the CT to produce MIPs only of PET data located within these segmentations.

One disadvantage of this approach is that by restricting the view to an organ-specific MIP, the clinician is unable to assess body regions outside this organ segmentation.

SUMMARY

It is an object to address these problems and provide improvements upon a known devices and methods.

In a method or apparatus for generating, from medical image data of the subject from a functional imaging modality, a modified intensity projection image for display. An intensity projection image data set is obtained from the image data. A segmentation for the image data is obtained. Based on information from the segmentation, a modified display property is calculated for at least one voxel of the intensity projection image data set.

BRIEF DESCRIPTION OF THE DRAWINGS

FIG. 1.1 is a diagram illustrating an image according to a previously considered method;

FIG. 1.2 is a diagram illustrating an image processing method according to an exemplary embodiment of the invention;

DESCRIPTION OF THE PREFERRED EMBODIMENTS

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included.

In general terms, one exemplary embodiment of a first aspect can provide a method of generating, from medical image data of a subject from a functional imaging modality, a modified intensity projection image for display, the method comprising: obtaining an intensity projection image data set from the image data; obtaining a segmentation for the image data; and calculating, based on information from the segmentation, a modified display property for at least one voxel of the intensity projection image data set.

This gives a quick and clear means of identifying voxels in a modified intensity projection image, without requiring the subtraction of information from the image, or indeed the addition of further data to the image.

Preferably, the modified display property is an altered color component. More preferably, the modified display property is an altered hue for an HSV display.

Suitably, the segmentation is three-dimensional, and comprises at least one volume of interest.

Preferably, the method further comprises a step of determining for the at least one voxel a corresponding position in the three-dimensional segmentation, and determining whether the position is contained in a volume of interest.

In an embodiment, the step of calculating comprises calculating a modified display property for each of a plurality of voxels of the intensity projection image data set contained by the volume of interest.

In another exemplary embodiment, the segmentation comprises a plurality of volumes of interest, and wherein the step of calculating comprises, for a volume of interest containing the at least one voxel, dividing an integer identifier for the volume of interest by the total number of volumes of interest in the segmentation.

Suitably, the step of calculating comprises setting a hue component for the at least one voxel as the calculated quotient of the integer identifier and number of volumes of interest.

This maximizes the difference in hue between voxels identified in different volumes of interest.

In one exemplary embodiment, the method further comprises, if the at least one voxel is not contained by any volume of interest, setting a hue component for the at least one voxel as zero.

Suitably, the method further comprises setting a saturation component for the at least one voxel contained by a volume of interest at a maximum.

Preferably, the method further comprises, if the at least one voxel is not contained by any volume of interest, setting a saturation component for the at least one voxel at a minimum.

In one exemplary embodiment, the method further comprises using an intensity value for the at least one voxel as a value component.

Preferably, a volume of interest is associated with an organ of the subject.

In an exemplary embodiment, the step of calculating comprises rendering the intensity projection image data set for display.

Preferably, the modified intensity projection image data set is an intensity projection image data set rendered for display on an HSV display.

In one exemplary embodiment, the method further comprises the steps of: obtaining a secondary image data set; and determining the segmentation from the secondary image data set.

More preferably, the secondary image data set is of the same subject.

Suitably, the method further comprises determining a registration between the intensity projection image data set and the secondary image data set.

In an exemplary embodiment, the secondary image data set is obtained from a different imaging modality from the intensity projection image set.

In another exemplary embodiment, the secondary image data set is from image data from an anatomical imaging protocol.

One exemplary embodiment of a second aspect can provide apparatus for generating, from medical image data of a subject from a functional imaging modality, a modified intensity projection image for display, the apparatus comprising: a processor configured to obtain an intensity projection image data set from the image data; obtain a segmentation for the image data; and calculate, based on information from the segmentation, a modified display property for at least one voxel of the intensity projection image data set; and a display device configured to display the modified intensity projection image.

Further aspects of the exemplary embodiments comprise computer programs which, when loaded into or run on a computer, cause the computer to become apparatus, or to carry out methods, according to the aspects described above.

The above aspects and embodiments may be combined to provide further aspects and embodiments.

Exemplary embodiments will now be described by way of example with reference to the accompanying drawings; and wherein when the following terms are used herein, the accompanying definitions can be applied:
PET—Positron Emission Tomography
SUV—Standardised Uptake Value
FDG—F-18 fluorodeoxyglucose, a PET radiotracer
MIP—Maximum Intensity Projection (or Minimum Intensity Projection, usually denoted MinIP)
MRI—Magnetic Resonance Imaging
ROI/VOI—Region/volume of interest.
Segmentation—the process of labelling voxels as belonging to different classes. For example, in a medical image, each voxel may be labelled according to its tissue type.
CT—Computed Tomography
HSV—Hue Saturation Value
MPR—Multi-Planar Reconstruction Exemplary embodiments produce an "anatomically-aware" shaded MIP—an intensity projection image in which the data in the image itself is modified (or rendered for display), rather than data being removed from the MIP, or by data being added to the MIP or to a fusion image (such as in previously considered alpha-blending or overlaying of images with/on the MIP).

One exemplary embodiment uses organ-specific color shading to facilitate organ localization of individual intensities in the MIP. Typically, existing organ segmentations derived from a co-registered image volume (either automatically via existing segmentation algorithms or drawn manually) are incorporated into the MIP through the 'Hue' component of an HSV-colored display.

Figure 12:
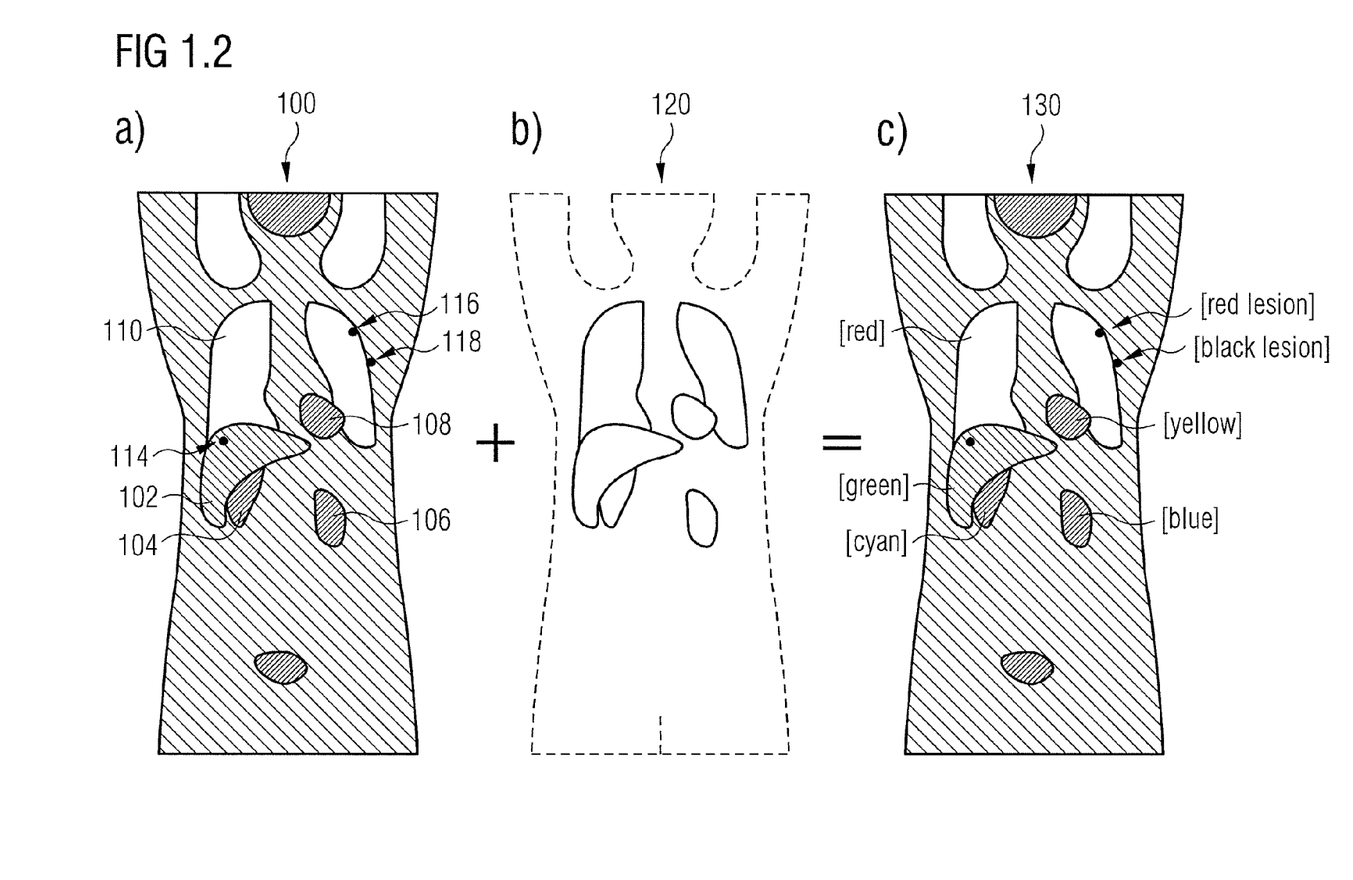

An example is shown in FIG. 1.2, in which the first image (100) is, as in FIG. 1.1, a schematic representation of an 18F-FDG PET MIP with areas of high uptake colored more darkly. Three lesions are present (114, 116, 118), two near the boundary of the lung, and one in the liver. Organ segmentations (120) from a co-registered image volume, in this case a CT scan, are provided. In this example, segmentations for the left and right lungs (110), heart (108), liver (102) and left (104) and right kidneys (106) are shown.

The segmentations are used to produce the final image (130), a schematic representation of an anatomically-aware shaded MIP. Typically the intervening step will require a registration of the two images. The organs (102, 104, 106, 108, 110) with corresponding segmentations (120) each use a different hue value to display the range of intensities originating from them. Here, the hues used for the organs are green for the liver (102), cyan for the left kidney (104), blue for the right kidney (106), yellow for the heart (108) and red for the lungs (110). As can be seen, the organs, though different colors, also still reflect the amount of uptake in those regions. For example, the right kidney is a dark blue, and the lungs are essentially colorless—the uptake shown in the MIP (100) was zero for this area. The three lesions can now clearly be identified as originating from different organs, because their colors are reflected in the shaded MIP—the liver lesion is green, and the two lesions 116 and 118 can now be distinguished—the first (116) did indeed fall inside the lung organ segmentation, and is shown as red (contrasting with the colorless low/zero uptake in the rest of the lungs), whereas the second is black, and therefore was not included in any segmented region.

Figure 2:
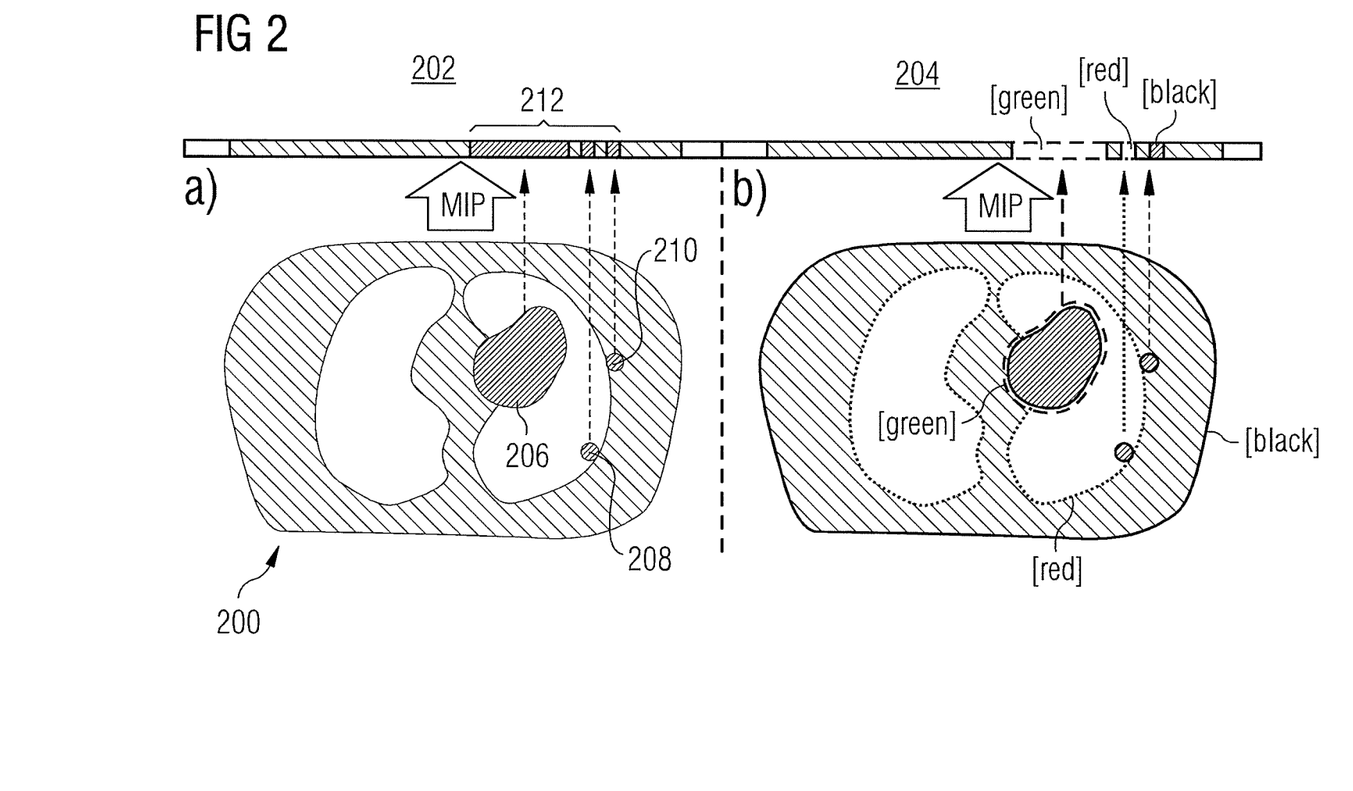
FIG. 2 is a diagram illustrating an axial/transversal view of an image volume processed according to an exemplary embodiment of the invention.

Another illustration is shown in FIG. 2. The first image (202) is a schematic representation of maximal intensity projection of an axial 18F-FDG PET slice of a subject (200).

Again, all areas of high uptake (206, 208, 210) are displayed using the same grey-scale color map in the MIP. Here, as the uptakes are so similar, these give essentially the same grey-scale values (212) in the MIP, making these areas somewhat indistinguishable.

The second image (204) uses organ-specific coloring of high uptake regions on the MIP for the same axial slice. Here, the dashed line indicates a region highlighted in green, the dotted line in red, and the solid line in black. The organ segmentations are overlaid on the axial slice. The three regions of high uptake (heart 206, lung lesion 208 and rib lesion 210) are each displayed using a different hue value in the MIP (green, red and black) thereby aiding distinguishability.

In an embodiment, the steps of the method are as follows:
1. Record position of PET voxel with maximum intensity along projection line.
2. Identify the corresponding position on CT volume.
3. If voxel enclosed within an organ segmentation, set the hue component for the corresponding MIP intensity to the quotient of the unique integer index for that organ segmentation divided by the total number of organ segmentations (i.e., the organ segmentations are labelled 1 . . . n, with n being the number of organ segmentations).
4. If the voxel is not enclosed within an organ segmentation, set the hue component to zero.

Step 3 gives the greatest possible contrast in colors between the organs—the hue spectrum is divided equally between the organs, and the relevant integer identifier for the organ gives the section of the hue spectrum used.

The original PET intensity is incorporated into the image via the 'Value' component (following normalization of intensity values to the range [0,1]). The 'Saturation' component is set to one (i.e., maximum) for those intensities in the MIP corresponding to an organ segmentation (i.e., those having a non-zero Hue component) and set to zero (i.e., minimum) for all others.

Following these steps, the MIP is effectively "rendered" or converted into a shaded form displayed by an HSV enabled display. This could of course be a standard display with software interpreting an HSV image.

An advantage of coloring the PET image by modifying the Hue values of certain pixels is that it simplifies the display without having to use an alpha-blended overlay, which would reduce the clarity of the displayed MIP.

Figure 3:
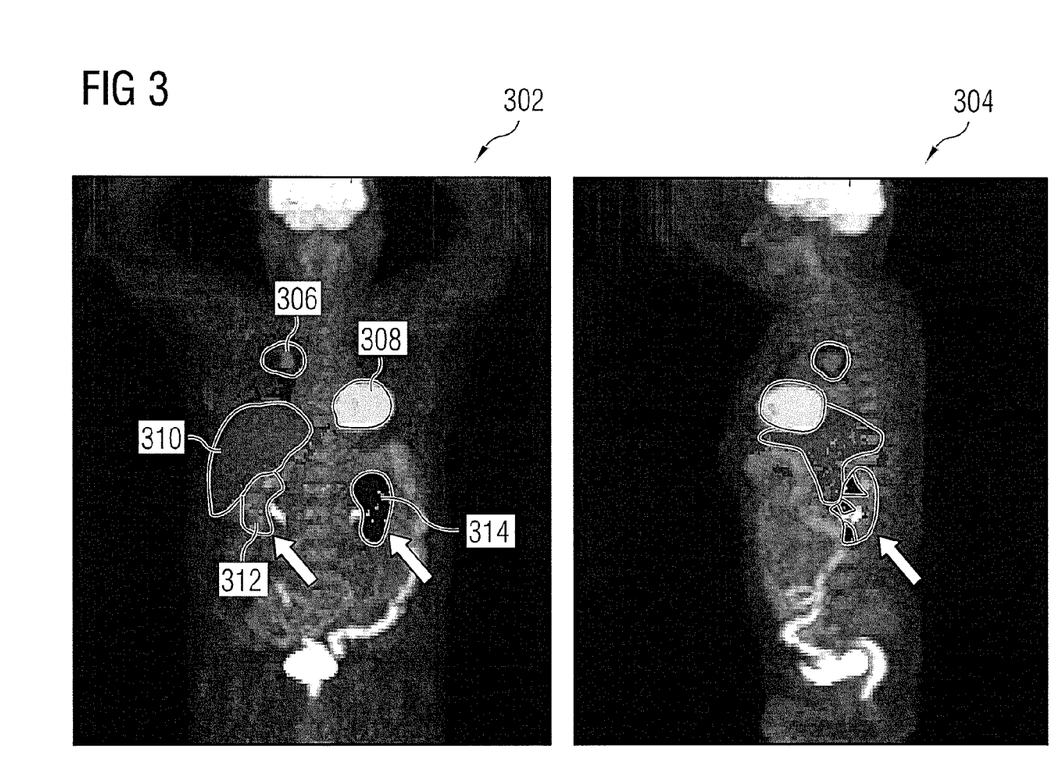
FIG. 3 is an example of an imaged volume illustrating an exemplary embodiment of the invention.

FIG. 3 shows Anterior-Posterior (302) and Left-Right (304) projections of an anatomically-aware MIP that has been colored as described above, with intensities corresponding to the lungs (306), heart (308), liver (310), right kidney (312) and left kidney (314) colored purple, yellow, green, blue and cyan respectively. The kidneys are further indicated by the arrows.

As with the greyscale coloring for the intensities not originating from a segmented organ, the brighter the intensity of the colored pixels, the higher the uptake in the original PET data.

The advantage of such shading can be seen in the right hand image in FIG. 3, where the two kidneys (312, 314) are effectively overlaid along the projection (arrows). With the shading it is still possible to determine to which kidney a particular intensity belongs. This overlaying effect is due to the shading method—if the maximum (hottest) voxel along the Left-Right projection line resulting in the 2D pixel is in the right kidney, the pixel will be shown as blue (in the right-hand image 304). If the maximum along a line is in the left kidney, the pixel is shown as cyan. For other pixels where the corresponding line has a maximum along it which is in neither organ, the pixel is black. Therefore in the Left-Right image 304, the "combined" kidney is a combination of cyan and blue.

This effect can also be seen if there are two regions of differing uptake, one obscured (surrounded) by the other and having lower uptake generally, but the obscured region having a hotspot. The MIP view at an angle obscuring the lower uptake region will show the color of the outer region for all pixels except those for lines which pass through the hotspot, where the uptake is higher than both regions. For the hotspot, a different color will be seen, that of the organ obscured, identifying not only the hotspot, but which of the organs it originates from.

Figure 4:
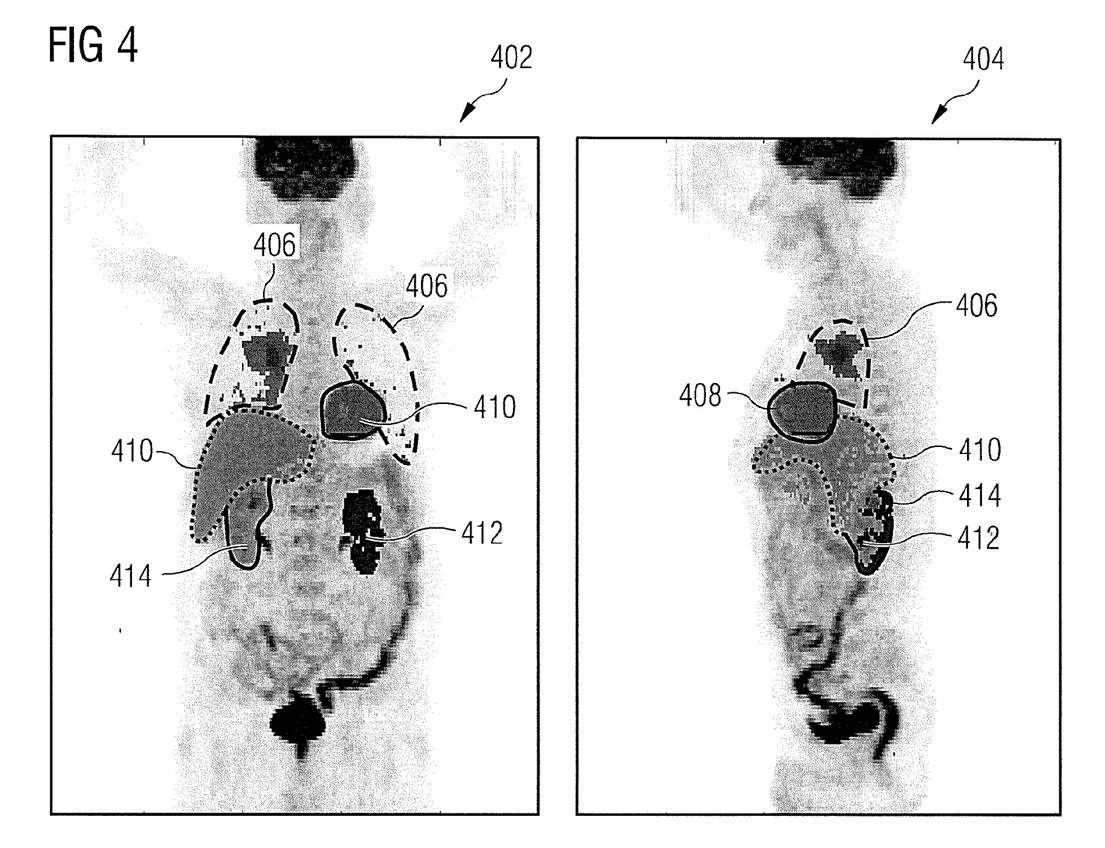
FIG. 4 is an example of an imaged volume illustrating an exemplary embodiment of the invention.

The MIP can also be displayed using an inverse greyscale, as shown in FIG. 4, Anterior-Posterior (402) and Left-Right (404) projections of the anatomically-aware MIP. Again, intensities originating from the lungs (406), heart (408), liver (410), right kidney (412) and left kidney (414) are colored purple, yellow, green, blue and cyan respectively) by subtracting the normalized original PET intensity from one and assigning this to the value component of the HSV. To avoid the colored regions converging to black at high PET intensities, the value component of these colored regions (i.e., with non-zero hue components) can be computed by scaling the normalized original PET intensity (e.g., multiplying by 0.75) before subtracting it from one.

In an alternative exemplary embodiment, to coloring the intensities of the PET data based on the originating organ, the entire MIP can be displayed initially in greyscale, and any VOIs created by the user in the MIP view are colored in the MIP based on the organ in which they are located. For example, if the user identifies a hotspot (in the greyscale image) on the lung, and draws a VOI over it, the already generated lung color (red) will be shown for that hotspot, if it is in fact in the lung. If the lesion is outside the lung, the VOI may be shown in red, with a black lesion, indicating a lung region, and the lesion being outside it.

An additional option is to show a fused VRT (Volume Rendering Technique) of the CT with a fused MIP colored in the same fashion. This combination of the MIP as described above may give more information as to the accompanying structure in the regions identified.

In other alternatives, rather than deriving the organ segmentations from a co-registered CT scan, they can be derived from a co-registered MRI scan, or in certain cases from the original 3D PET scan.

In another alternative, the segmentation information can be applied to the MIP directly, rather than by another image registered with the MIP. In the example of deriving the segmentation from the PET scan itself, the registration step will not of course be required, and the segmentation can be applied manually, or by an algorithm detecting anatomical areas in the PET image.

Figure 5:
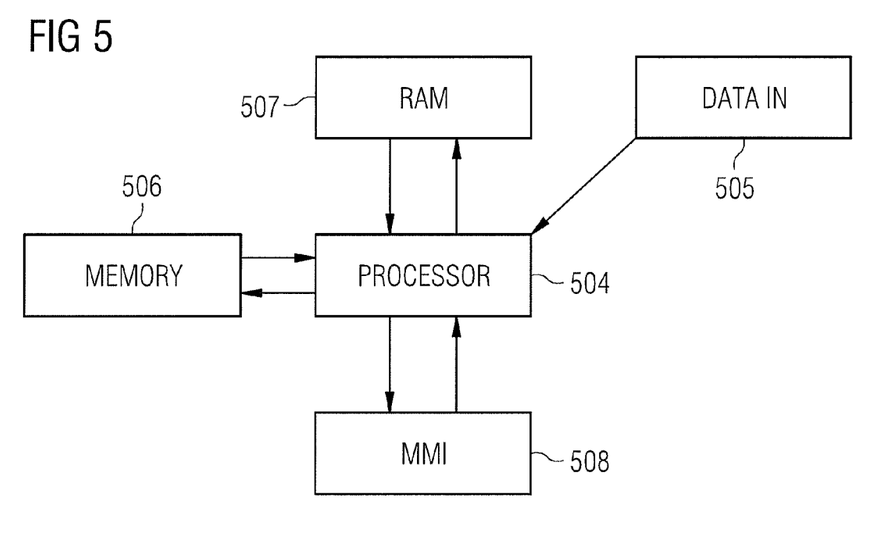
FIG. 5 is a diagram illustrating an apparatus according to an exemplary embodiment of the invention.

Referring to FIG. 5, the above exemplary embodiments of the invention may be conveniently realized as a computer system suitably programmed with instructions for carrying out the steps of the methods of the exemplary embodiments.

For example, a central processing unit 504 is able to receive data representative of medical scans via a port 505 which could be a reader for portable data storage media (e.g. CD-ROM); a direct link with apparatus such as a medical scanner (not shown) or a connection to a network.

Software applications loaded on memory 506 are executed to process the image data in random access memory 507.

The processor 504 in conjunction with the software can perform the steps such as obtaining the intensity projection image data set from the image data; obtaining the segmentation for the image data; and calculating, based on information from the segmentation, the modified display property for the at least one voxel of the intensity projection image data set.

A Man-Machine interface 508 typically includes a keyboard/mouse/screen combination (which allows user input such as initiation of applications) and a screen on which the results of executing the applications are displayed.

It will be appreciated by those skilled in the art that the invention has been described by way of example only, and that a variety of alternative approaches may be adopted without departing from the scope of the invention, as defined by the appended claims.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method of generating from medical image data of a subject from a functional imaging modality a modified intensity projection image for display, comprising the steps of:
    obtaining an intensity projection image data set from the image data;
    obtaining a three-dimensional segmentation for the image data, the segmentation comprising a plurality of volumes of interest;
    determining for each of a plurality of voxels a corresponding position in the three-dimensional segmentation, and determining whether the position is contained in a respective volume of interest;
    for a volume of interest containing at least one of the voxels, dividing an integer identifier for the respective volume of interest by a total number of said plurality of volumes of interest in the segmentation to provide a respective calculated quotient of the respective integer identifier and the total number of volumes of interest;
    setting an altered hue component for the at least one voxel of the volume of interest according to the calculated quotient; and
    creating the modified intensity projection image for display on a HSV display with said altered hue component of the at least one voxel of the volume of interest.

2. The method according to claim 1 wherein if a voxel of said plurality of voxels is not contained by any volume of interest, setting a hue component for the voxel as zero.

3. The method according to claim 2 wherein the respective voxel not contained by any volume of interest has a saturation component thereof set at a minimum.

4. The method according to claim 1 wherein a saturation component of the at least one voxel contained within the volume of interest is set at a maximum.

5. The method according to claim 1 wherein the volumes of interest are associated with respective organs of the subject.

6. The method according to claim 1 wherein the modified intensity projection image is displayed on the HSV display.

7. The method according to claim 1 further comprising the steps of obtaining a secondary image data set for the image data, and determining the segmentation for the image data from the secondary image data set.

8. The method according to claim 7 wherein the secondary image data set is of a same subject.

9. The method according to claim 7 further comprising determining a registration between the intensity projection image data set and the secondary image data set.

10. The method according to claim 7 wherein the secondary image data set is obtained from a different imaging modality from the intensity projection image set.

11. The method according to claim 7 wherein the secondary image data set is from image data from an anatomical imaging protocol.

12. An apparatus for generating from medical image data of a subject from a functional imaging modality a modified intensity projection image for display, comprising:
    An HSV display;
    a processor configured to perform the steps of
        obtaining an intensity projection image data set from the image data,
        obtaining a three-dimensional segmentation for the image data, the segmentation comprising a plurality of volumes of interest,
        determining for each of a plurality of voxels a corresponding position in the three-dimensional segmentation, and determining whether the position is contained in a respective volume of interest,
        for a volume of interest containing at least one of the voxels, dividing an integer identifier for the respective volume of interest by a total number of said plurality of volumes of interest in the segmentation to provide a respective calculated quotient of the respective integer identifier and the total number of volumes of interest, and
    setting an altered hue component for the at least one voxel of the volume of interest according to the calculated quotient; and
    creating the modified intensity projection image for display on a HSV display with said altered hue component of the at least one voxel of the volume of interest.

13. A non-transitory computer readable medium having a computer program tangibly embodied thereon for generating from medical image data of a subject from a functional imaging modality a modified intensity projection image for display, said program performing the steps of:
    obtaining an intensity projection image data set from the image data;
    obtaining a three-dimensional segmentation for the image data, the segmentation comprising a plurality of volumes of interest;
    determining for each of a plurality of voxels a corresponding position in the three-dimensional segmentation, and determining whether the position is contained in a respective volume of interest;
    for a volume of interest containing at least one of the voxels, dividing an integer identifier for the respective volume of interest by a total number of said plurality of volumes of interest in the segmentation to provide a respective calculated quotient of the respective integer identifier and the total number of volumes of interest;
    setting an altered hue component for the at least one voxel of the volume of interest according to the calculated quotient; and
    creating the modified intensity projection image for display on a HSV display with said altered hue component of the at least one voxel of the volume of interest.

* * * * *